United States Patent [19]

Rokop et al.

[11] 4,437,899
[45] Mar. 20, 1984

[54] METAL BILLET CUTTING APPARATUS AND METHOD

[75] Inventors: Joseph Rokop, Pittsburgh; Nikolaus Rokop, Bridgeville, both of Pa.

[73] Assignee: Rokop Corporation, Pittsburgh, Pa.

[21] Appl. No.: 516,907

[22] Filed: Jul. 25, 1983

[51] Int. Cl.³ .............................................. B23K 7/02
[52] U.S. Cl. ...................................... 148/9 R; 266/50
[58] Field of Search ......................... 266/50; 148/9 R

[56] References Cited

U.S. PATENT DOCUMENTS

| | | | |
|---|---|---|---|
| 3,462,134 | 8/1969 | Michelson | 266/50 |
| 3,588,066 | 6/1971 | Reinfeld | 266/50 |
| 3,692,292 | 9/1972 | Rokop | 266/50 |
| 3,901,491 | 6/1975 | Miklos | 266/50 |
| 3,953,005 | 4/1976 | Rokop | 266/50 |
| 4,329,187 | 5/1982 | Ushioda et al. | 266/50 |
| 4,390,167 | 6/1983 | Ito et al. | 266/48 |

*Primary Examiner*—W. Stallard
*Attorney, Agent, or Firm*—Carothers & Carothers

[57] ABSTRACT

A metal processing system wherein a material removing means such as a shear blade is operative in conjunction with the transverse cutting action of a torch for removing from the cut line produced by the torch residual material resulting from the cutting action of the torch in a manner that the residual material is removed progressively along the transverse cut line in coordinated following relationship to the producing of the transverse cut line by the torch.

11 Claims, 7 Drawing Figures

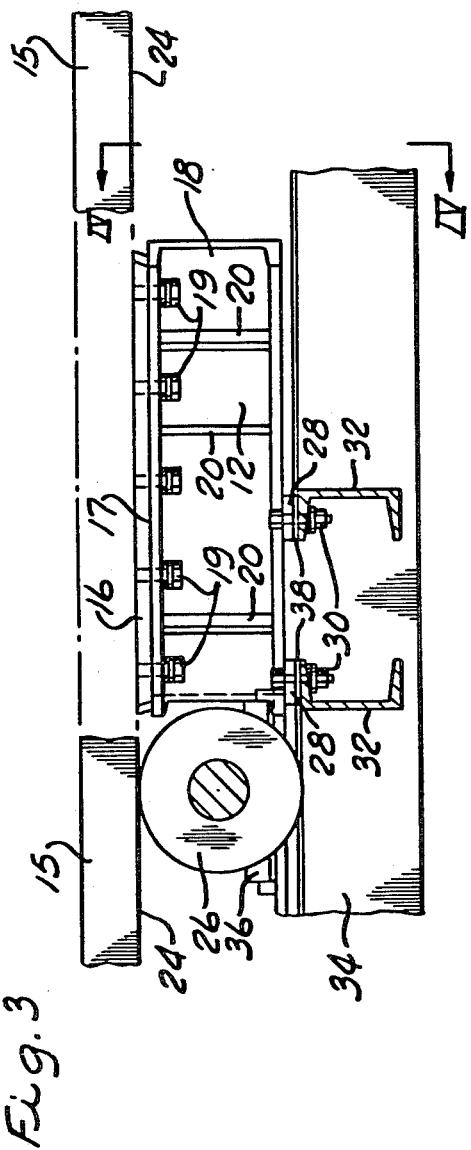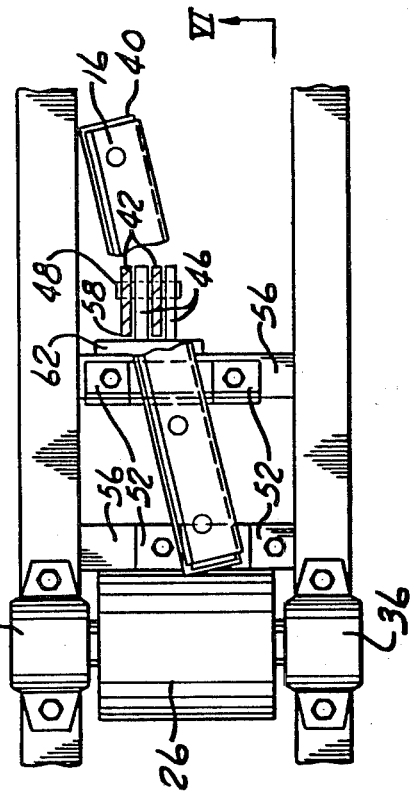

METAL BILLET CUTTING APPARATUS AND METHOD

BACKGROUND OF THE INVENTION

In the art of continuous casting of metals such as steel, it is well known to provide for the cutting of a continuously cast strand of metal into billets. Typically, continuous strands of cast metal are produced by pouring the metal in a molten state through the top of an elevated flow-through casting mold and withdrawing the solidifying metal continuously from an opening in the bottom of the mold as an elongated strand which progressively solidifies as it emerges and recedes from the mold. As the strand is withdrawn from the mold, it typically is cooled in a spray chamber, drawn through a curved roller apron to change its direction of travel from vertical to horizontal, and then is passed through a withdrawal mechanism which provides the power to withdraw the strand from the mold and pull it through the roll apron. The withdrawal mechanism also typically straightens the metal strand since the strand is bent into a curved configuration while passing through the roller apron.

The strand commonly is cut into discrete billets without interrupting the longitudinal travel thereof. One established cutting means includes use of an oxyacetylene cutting torch which is mounted on a movable carriage for movement longitudinally with the cast metal strand while being transversed laterally thereacross to cut the strand laterally. The torch typically is mounted for movement in longitudinally synchronous fashion with respect to the metal strand in a manner to produce, in conjunction with the lateral transversing component of the torch motion, a straight crosscut across the metal strand. The individual billets commonly are passed in sequence onto a run-out table equipped with rollers for conveying the billets from the cutting table.

Although prior cutting torches for the cutting of continuously cast metal strands have generally served their intended purposes, they have nevertheless been subject to certain shortcomings. For example, as the torch cuts across a strand, the molten metal from the cut line runs to the bottom of the cut and solidifies on the lower edge of the cut to form a solid lip (commonly called a bead or fash) therealong. Such fash commonly is a mixture of slag, metal and ash which has generally poor adhesion to the billet. Nevertheless, in the prior art, fash removal has been a difficult and tedious chore.

Some prior approaches to fash removal have included directing a stream of oxygen at the lower edge of the hot strand along the cut line to burn off and/or blow away the molten metal and slag before it can accumulate and solidify. The expense of oxygen makes this approach to fash removal or prevention somewhat undesirable. In addition, the removal mechanism is somewhat uncontrolled in that molten material blown away from the cut line may be deposited on flat surfaces of the billet or on portions of the continuous casting apparatus. Other approaches to fash removal have included tedious and inefficient manual grinding or torch cutting of the cut line edge to remove the solidified fash. These and other prior approaches to fash removal have necessitated excessive and unproductive handling of the billets.

Although difficult and inefficient, prior fash removal apparatus and methods have nevertheless been a necessary part of the continuous casting process, because to leave the fash intact on the billet would invite considerable problems in subsequent processing. For example, the fash on a billet may impact on and damage the rolls or other conveying equipment associated with the cutting table, the runout table or on other parts of the continuous casting system. More significantly, in billet rolling operations, the fash may cause cobbles in the rolling mill.

SUMMARY OF THE INVENTION

The present invention alleviates the above and other problems by providing for the mechanical removal of fash from a billet, preferably while the fash is still hot and soft or semi-molten. The invention contemplates such fash removal by means which are operative in conjunction with the movement of the billet longitudinally along its pass line with respect to the cutting table and/or the run-out table whereby unproductive additional handling of the billet is eliminated. The invention may be utilized in continuous casting and other basic metal processing apparatus for the removal of fash from billets, slabs, blooms and other forms, all collectively referred to hereinbelow as billets for convenience.

In one preferred embodiment thereof, the invention includes a stationary shear blade positioned at an angle to the pass line of the billet and extending entirely across the width of the billet in a manner that the cutting edge of the shear blade progressively passes along the lower edge of a transverse cut line in the billet from one lateral edge thereof to the other as the billet moves along its pass line thus progressively removing the fash which has formed along the cut line directly behind the movement of the cutting torch which is forming the cut line, or alternatively may be positioned somewhat more remote from the cutting torch. In alternative embodiments of the invention, a grinding cylinder, rotary knife, scraper blade, or other mechanical material removing means may be employed in place of the mentioned shear blade. The invention thus permits fast, efficient and clean removal of fash from metal billets by use of mechanical removal means operative in conjunction with the usual movement of the billet along its pass line through the processing apparatus.

It is therefore one object of the present invention to provide an improved method and apparatus for removal of fash from a metal billet in a continuous casting process.

A more specific object of the present invention is to provide a mechanical material removal means operative in conjunction with the movement of a billet along its pass line for removing fash from a transverse cut line formed across the lateral extent of the billet.

Another more specific object of the present invention is to provide mechanical fash removal means which removes the fash from a transverse cut line by progressive removal thereof along the extent of the cut line in predetermined synchronous following relationship to the progressive motion of the cutting torch which forms the cut line.

BRIEF DESCRIPTION OF THE DRAWINGS

Other objects and advantages appear in the following description and claims.

The accompanying drawings show, for the purpose of exemplification, without limiting the invention or the claims thereto, certain practical embodiments illustrating the principles of this invention wherein:

FIG. 3 is a sectional side elevation taken on line 3—3 of FIG. 2;

FIG. 4 is an end elevation taken on line 4—4 of FIG. 3;

FIG. 5 is a top plan view similar to FIG. 2 showing an alternative embodiment of the present invention;

DETAILED DESCRIPTION OF THE PREFERRED EMBODIMENT

Figure 1:
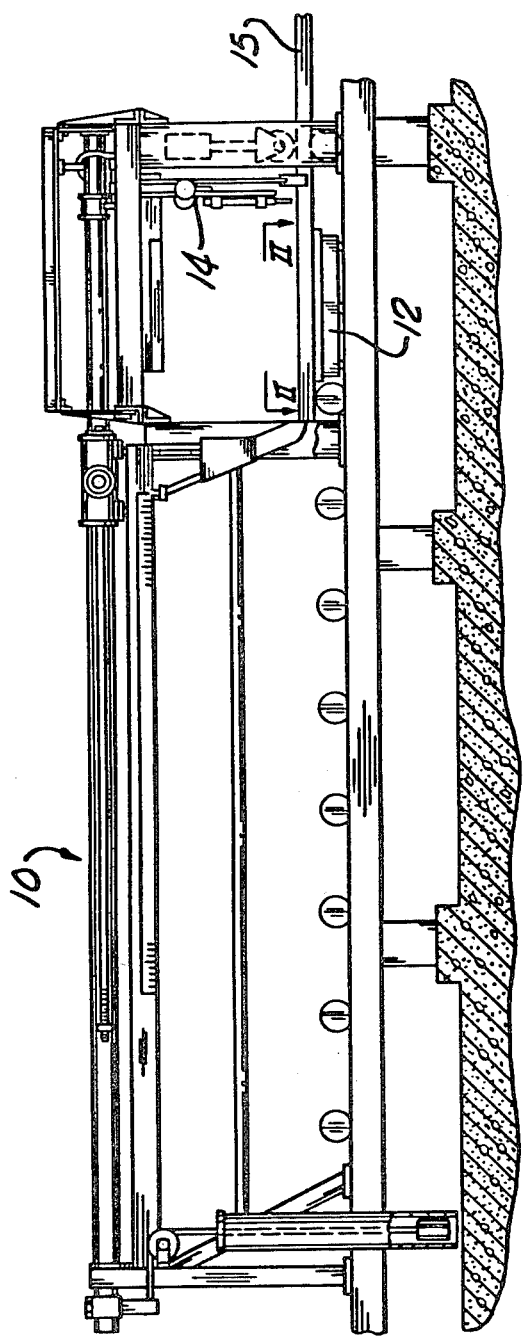
FIG. 1 is a side elevation of a cutting table and torch cutting station of a continuous casting system including fash removal means according to the present invention.

There is generally located at 10 in FIG. 1 a cutting table portion of a continuous casting system including a fash removal apparatus 12 constructed in accordance with one presently preferred embodiment of the present invention, and being operative in conjunction with operation of a cutting torch apparatus 14 to cleanly cut across the lateral width of an elongated continuous cast metal strand 15. Strand 15 has been conventionally cast in a continuous casting apparatus (not shown) as by being withdrawn progressively from a continuous casting mold and passed through a spray chamber, a roller apron and a withdrawal mechanism prior to feeding thereof on a generally horizontal pass line along the cutting table 10.

Inasmuch as all of the elements mentioned hereinabove, apart from the fash removal apparatus 12, are well known to those skilled in the art, further detailed description thereof is not necessary for an understanding of the present invention. Suffice it to note in this regard that torch 14 is movably mounted to move in synchronous relationship with the longitudinal movement of strand 15 while traversing laterally of the strand 15, preferably in a manner to produce a straight laterally-extending cross cut from one lateral side of strand 15 to the opposite lateral side thereof whereby the strand 15 may be separated into discrete billets. The above and other aspects of the structure and operation of prior torch cutting apparatus are described in U.S. Pat. Nos. 3,462,134; 3,588,066; 3,692,292; 3,901,491; and 3,953,005, for example.

Figure 2:
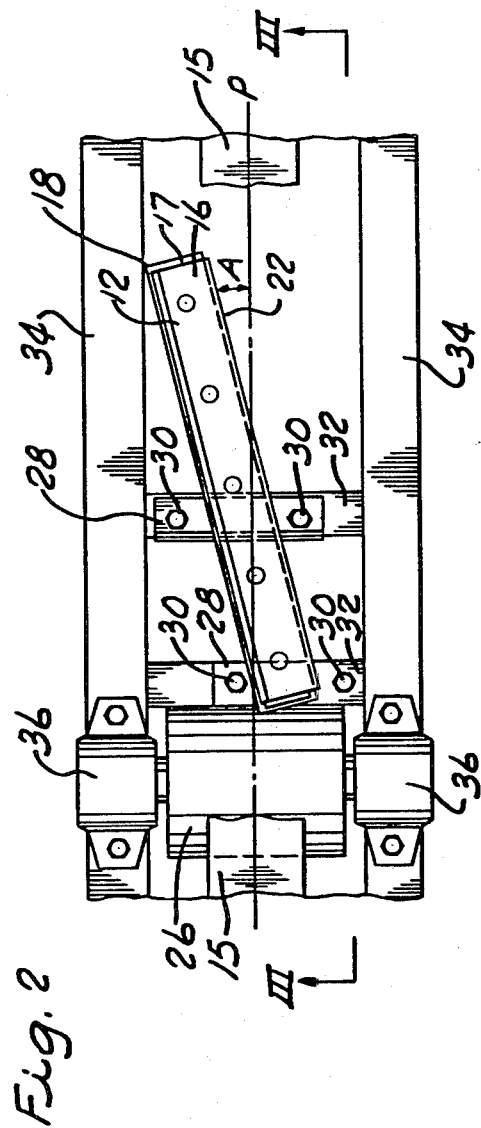
FIG. 2 is a fragmentary top plan view on line 2—2 of FIG. 1 and showing a fash removal means according to one presently preferred embodiment of the present invention.

Referring to FIGS. 2, 3 and 4, it will be seen that the fash removal apparatus 12 according to one preferred embodiment of the present invention includes an elongated shear blade 16 fixedly mounted upon an upper mounting surface portion 17 of a rigid elongated carrier member 18 as by bolts 19 threadedly engaged within corresponding tapped bores in blade 16. Carrier member 18 may be of such structure as, for example, a steel channel member having plural, longitudinally spaced reinforcing webs 20 welded in place as shown for structural strength. Carrier member 18 is mounted in juxtaposition to torch 14 at an angle A of approximately 15 degrees, for example, to the pass line P of strand 15 and is sufficiently elongated that a cutting edge 22 of blade 16 is presented to the underside of strand 15 and extends throughout the lateral width of strand 15 for shearing fash therefrom. Shear blade 16 preferably is reversible as shown in FIG. 4, whereby when the cutting edge 22 becomes worn, the blade 16 may be removed from carrier 18 and reverse mounted thereon to present a second cutting edge 22' to strand 15.

The mounting of carrier member 18 is such as to align the upper surface of blade 16 mounted thereon and the cutting edge 22 thereof in sliding or scraping contact with the underside 24 of strand 15 when strand 15 is supported upon the cutting table for traverse thereof along pass line P. The strand 15 is supported as by plural rollers 26 or other suitable supports (not shown). Carrier member 18 is thus supported as by a pair of laterally elongated rigid steel pads 28 spaced longitudinally of carrier member 18 and rigidly secured thereto as by welding. Pads 28 are rigidly, removably secured by bolt and nut assemblies 30 to a respective pair of longitudinally spaced cross members 32 which extend laterally between and are rigidly affixed to respective longitudinally extending side frame members 34 which form a portion of the frame of cutting table 10. Members 34 also provide direct or indirect rigid support for rollers 26 as by support of bearing housings 36 within which the axle ends of roller 26 are journaled whereby structure is provided to maintain the desired alignment between blade 16 and the lower side 24 of strand 15 supported upon rollers 26.

In initially establishing the proper alignment of shear blade 16, shims 38 may be utilized between pads 28 and members 32 as required. The available adjustment of shear blade height or vertical location by use of shims 38 may be on the order of approximately 2 mm, for example.

Figure 6:
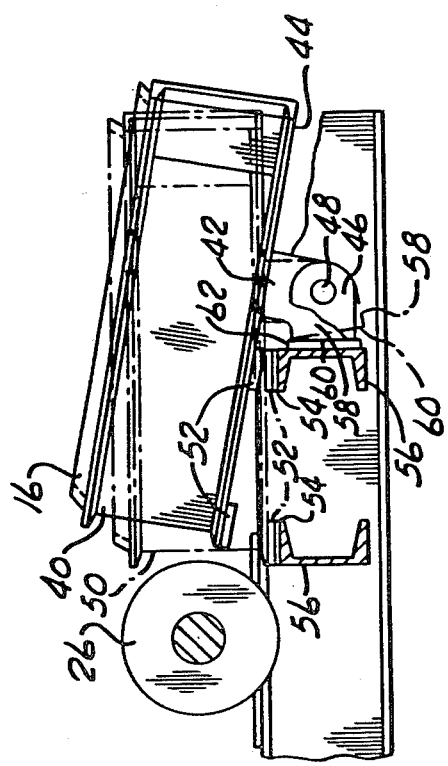
FIG. 6 is a side elevation taken on line 6—6 of FIG. 5.

Referring now to FIGS. 5 and 6, there is shown an alternative embodiment of the invention in the form of the shear blade 16, suitably removably mounted as above-described upon a rigid elongated carrier member 40 which includes a bifurcated clevis 42 rigidly affixed to the underside 44 thereof and extending downwardly therefrom. Clevis 42 is interfitted with the legs of a bifurcated clevis 46 which extends from one of a pair of cross members 56 and is rigidly mounted with respect thereto by means of a mounting pad 62 suitably secured to member 56.

The legs of the respective clevis members 42 and 46 are pivotally secured together as by a pivot pin 48 whereby carrier member 40 is movable between an inclined position, shown in solid lines in FIG. 6, and an operative or aligned position 50 as shown in phantom lines in FIG. 6. In the operative position thereof, support pads 52 mounted on the underside of carrier member 40 are supportingly engaged by cooperating pads 54 secured atop the cross members 56 to support blade 16 in alignment with the underside of a metal strand (not shown) for shearing of fash therefrom.

A maximum inclination of carrier 40 and blade 16 with respect to the pass line of a strand thereover is established by an extension 58 of clevis legs 42 which defines an abutment surface 60 that abuts mounting pads 62 to limit tilting or inclination of carrier 40 to a predetermined maximum inclination of, for example, approximately 15° degrees. Abutment surface 60 is shown in engagement with pad 62 in the broken out portion of FIG. 6, but is more readily visualized by the depiction therof in phantom line occupying the position it would occupy when shear blade 16 is in the operative or aligned position thereof.

The tilting capability of carrier 16 is beneficial in preventing the jamming of the leading edge of a strand of continuously cast metal. The leading end of such a strand is somewhat more flexible than normal due to its elevated temperature, and may tend to droop or sag under its own weight when the leading end thereof is momentarily unsupported as by a roller 26. Accordingly, it is possible that the leading edge of a strand may jam against the end of blade 16 if the blade is maintained in alignment with the ideal pass line of the strand. To alleviate this problem, the tilting support member 40 preferably is suitably proportioned or weighted to assume the inclined orientation thereof by gravity whenever no strand is passing thereover. Accordingly, clearance is provided for the leading end of a strand to clear the front end of blade 16. The leading end of the strand subsequently engages blade 16 at a midpoint thereof and thereby rides the carrier member 40 to the operative position thereof as shown at 50. The carrier 40 and blade 16 are thus maintained in the operative position so long as the continuous strand is positioned on the pass line thereover.

Figure 7:
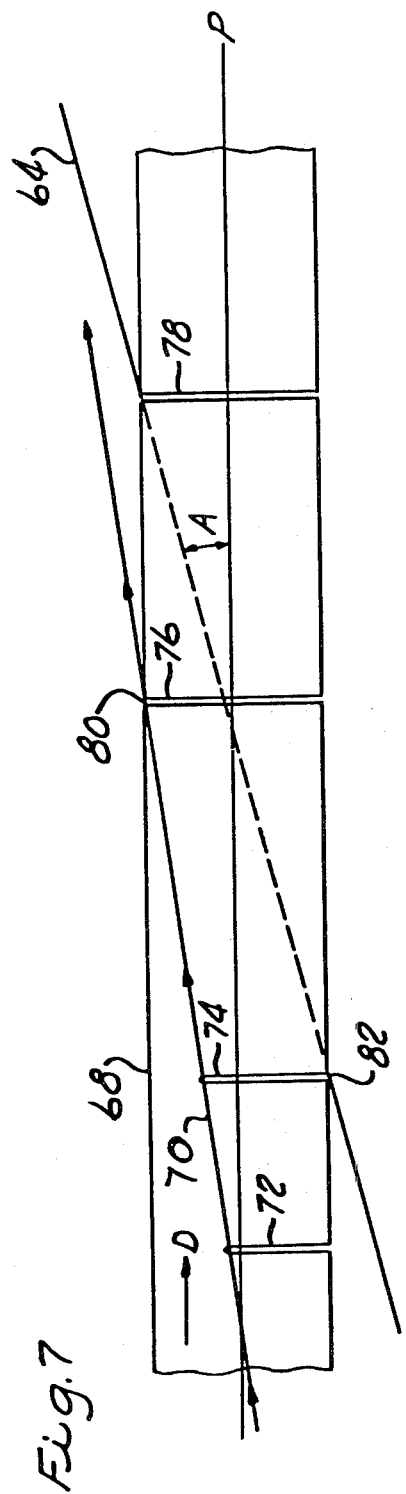
FIG. 7 is a schematic depiction of the manner of operation of a preferred embodiment of the present invention.

From the above description, the manner of operation of the fash removal apparatus 12 will be understood on reference to FIG. 7 wherein there is schematically represented a shear blade cutting edge portion extending on a line of action 64 in operative engagement with a strand 68 of continuously cast material and at an angle A to the pass line P along which strand 68 moves in the direction indicated by arrow D.

A cutting torch on a carriage of conventional design (not shown) is movable longitudinally in synchronous manner with respect to strand 68 and is able to be traversed laterally thereof whereby the torch is adapted to traverse a path along a line 70. As it traverses line 70, the torch is able to produce a cut line from one edge of strand 68, the lower edge as shown in FIG. 7, transversely thereof to the opposite edge of strand 68. Accordingly, as strand 68 progresses along pass line P, the cross cut is propagated incrementally across its width from one edge to the other. For example, as shown in FIG. 7 at 72, a cross cut has been propagated just over half way across the width of strand 68. At subsequent points in the longitudinal travel of strand 68 along pass line P, there are shown additional cross cuts 74, 76 and 78 which have been propagated successively further across the width of strand 68 by the torch, it being understood that FIG. 7 is illustrative in nature and, in fact, the torch cuts only one cross cut at any given time.

Cross cut 76 has just been completed at point 80. For the identical line of travel 70 of the torch, the cross cut of any strand of width equal to that of the strand 68 and centered on pass line P would be completed at point 80.

The orientation of the cutting edge of a shear blade on line of action 64 is operative at an angle A to pass line P such that the fash formed along cuts 72, 74, 76 and 78 is progressively sheared away by the cutting edge extending on line 64 beginning at point 82 where the cutting edge first engages the fash formed at the lower or beginning end of cut 74. As strand 68 moves along pass line P, the cutting edge which extends along line 64 moves progressively across the cut in the same direction and in synchronous following relationship to the cutting action of the torch. Thus, at the position of cross cut 76, the shear blade cutting edge has sheared the fash from just over half the total width of strand 68. At the position of cross cut 78, the cutting edge on line 64 has sheared the fash from the entire width of strand 68.

From FIG. 7, it will be appreciated that any of a variety of devices for mechanical removal of fash may be employed in lieu of a shear blade. For example, an elongated cylindrical grinder mounted for rotation on a suitable axis of rotation parallel to the line of action 64 may be juxtaposed with the underside of strand 68 along a line coinciding with the line of action 64 for removal of fash from portions of cross cuts intersecting line of action 64. Alternatively, an elongated rotary knife or scraper device mounted for rotation on an axis parallel to line 64 will similarly shave or scrape fash from the underside of a strand 68 as the rotating knife or knives act along a line coinciding with line 64. A conical grinder, rotary knife, milling tool or the like also may be suitably mounted for rotation to present a cutting edge or surface thereof to the underside of a strand 68 to act along the line 64.

In addition to the above alternatives, a multiplicity of independent mechanical material removal devices may be utilized, for example, a plurality of grinding wheels, the primary requisite in all cases being that the mechanical removal devices must be cooperable with each other and with a strand as it moves along its pass line to define at last one continuous, generally curvilinear line of action on the strand which sweeps the entire width of the strand, from one edge thereof to the other, preferably in the lateral direction of propagation of the cross cuts formed in the strand and without need of any lateral traversing mechanism for the mechanical removal means. The line of action of the mechanical material removal means on the strand preferably should be so disposed with respect to the longitudinally moving strand that the mechanical material removal takes place progressively from one end of a transverse cross cut toward the opposite end thereof and preferably in the direction that the cross cut was originally propagated as noted hereinabove.

The angle of the line of action of the material removal means with respect to pass line P is preferably within the range of approximately 15° degrees to approximately 60° degrees, and in the case of a non-linear line of action, the angle thereof with repect to pass line P should preferably be within the stated range at each discrete point throughout its length as determined by the angle of a tangent thereto at any such point with respect to pass line P.

According to the above description, there is provided by the present invention an improved means for removing fash from cross cuts formed by a torch in the process of separating a strand of material into discrete billets. The invention herein is not limited to those embodiments illustrated and described as other alternative embodiments have been contemplated. For example, strand support means other than rollers 26 may be suitably used in conjunction with the invention described herein; the specific relationship of the line of action of a shear blade or other material removal means with respect to the line of action of a cutting torch is not limited to the relationship shown in the exemplary FIG. 7; the range of available cutting, scraping, milling or grinding devices, as well as other mechanical material removal means and alternative designs therefor are not to be limited by the above-described embodiments; and the like. These and other embodiments and modifications having been envisioned and anticipated by the inventors, it is intended that the invention be construed as broadly as permitted by the scope of the claims appended hereto.

We claim:

1. In a metal processing apparatus wherein an elongated stand of metal is severed as it moves along a pass line by cutting means which is operative to cut the strand transversely of said pass line into billets of a given length, the improvement comprising:

a material removing means located at a fixed position with respect to the longitudinal extent of said pass line and operable to engage an exterior surface of said strand of metal moving on said pass line along at least one continuous line of action extending throughout the lateral extent of said exterior surface for removing material from said exterior surface as said strand moves along said pass line in a manner that the material removal effected by said material removing means at the location of any such transverse severing progresses transversely of said exterior surface from one lateral side of said strand to the other lateral side thereof as said strand moves along said pass line.

2. The improvement as claimed in claim 1, wherein said at least one line of action is a straight line of action oriented in non-parallel relationship to said pass line.

3. The improvement as claimed in claim 2, wherein said at least one line of action is oriented at angle of approximately 15° degrees to approximately 60° degrees to said pass line.

4. The improvement as claimed in claim 3, wherein said material removing means includes a shear blade having a cutting edge which engages said exterior surface to define said line of action.

5. The improvement as claimed in claim 3, wherein said material removing means includes rotary grinder means for contacting said exterior surface to define said line of action.

6. In a continuous casting apparatus wherein an elongated strand of material is severed transversely into billets as it moves along a pass line, the combination comprising:

cutting means supported for movement longitudinally of such a pass line in synchronous fashion with such a strand and for simultaneous movement transversely of such a strand to sever such a strand along a transverse cut line in a direction from one lateral side to the other lateral side of such strand;

material removing means located at a fixed position with respect to the longitudinal extent of such a pass line and the transverse extent of such strand for removing the residue of such severing of the strand by said cutting means from such a transverse cut line; and said material removing means being cooperable with such strand to remove such residue progressively from said one lateral side to said other lateral side of such strand in synchronous following relationship to the severing of such strand by said cutting means.

7. The combination as claimed in claim 6, wherein said cutting means is a cutting torch movable along a transverse cutting path with respect to such strand to cut such strand.

8. The combination as claimed in claim 7, wherein said material removing means include shear blade means having a cutting edge which engages such strand along a longitudinally and transversely extending line of contact therewith to shear away fash deposited during cutting by said torch.

9. The combination as claimed in claim 8, wherein said shear blade is carried for pivotal motion in the vertical plane coincident with such pass line between an operative position therof and a free position thereof and said shear blade is maintained in said operative position by contact with such a strand on such pass line.

10. The combination as claimed in claim 9, wherein said shear blade pivots to said free position by gravity when not engaged by such a strand on such pass line.

11. The method of severing a strand of metal into billets of a given length, comprising the steps of:

moving such a strand longitudinally along a pass line;

moving a cutting means longitudinally in synchronization with the movement of such a strand along such pass line;

coincident with said moving in synchronization, traversing said cutting means laterally of such strand from one lateral side to the other lateral side thereof to produce a continuous transverse cut which severs said strand;

providing material removing means at a fixed location with repect to the longitudinal extent of such pass line to engage an exterior surface portion of such strand moving along such pass line in a manner to remove residual material from the area of such continuous transverse cut progressively from said one lateral side to said other lateral side of such strand and in coordinated following relationship to the producing of said continuous transverse cut by said cutting means.

* * * * *